May 10, 1949.  C. H. WITTHOFFT  2,469,677
COMBINATION RADIAL AND THRUST BEARING
Filed Dec. 10, 1947
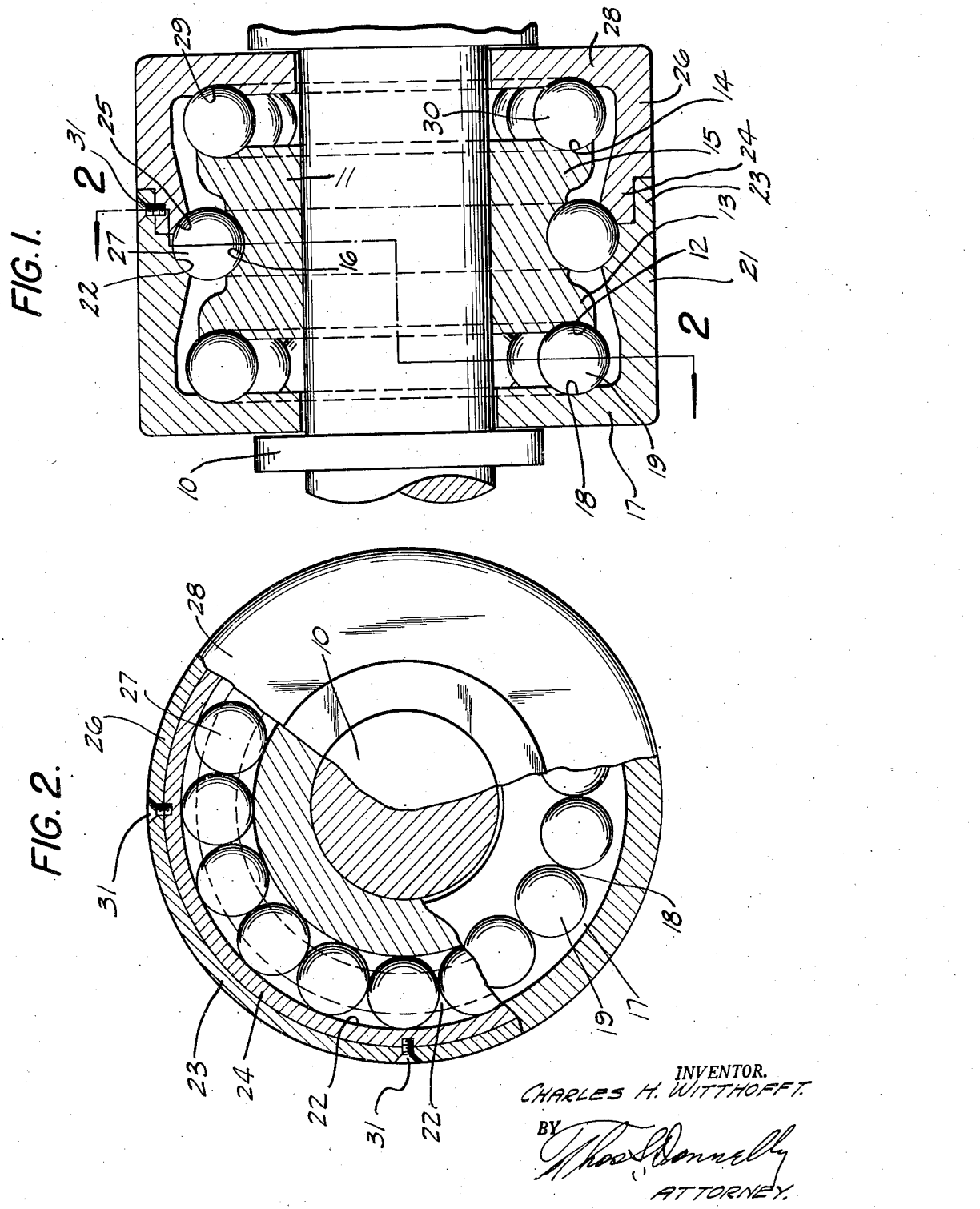
INVENTOR.
CHARLES H. WITTHOFFT.
BY
ATTORNEY.

Patented May 10, 1949

2,469,677

UNITED STATES PATENT OFFICE 2,469,677

COMBINATION RADIAL AND THRUST BEARING

Charles H. Witthofft, Detroit, Mich., assignor of one-half to Joseph F. Gohn, Grosse Ile, Mich.

Application December 10, 1947, Serial No. 790,807

2 Claims. (Cl. 308—174)

My invention relates to a new and useful improvement in a combination radial and thrust bearing adapted for use on shafts in which there is a radial thrust and also at times, a longitudinal thrust.

It is an object of the present invention to provide a bearing of this class which will be simple in structure, economical of manufacture, durable, compact, possessed of a minimum number of parts, economically manufactured and easily and quickly assembled and disassembled.

Another object of the invention is the provision of a bearing of this class which will be possessed of high efficiency, both when the radial thrust is delivered thereto and when the axial thrust is delivered thereto.

Other objects will appear hereinafter.

It is recognized that various modifications and changes may be made in the detail of structure illustrated without departing from the invention itself and it is intended that such shall be embraced within the scope of the claims which form a part hereof.

Forming a part of this specification are drawings in which,

Fig. 1 is a central, longitudinal, sectional view of the invention showing it applied, Fig. 2 is a sectional view taken on line 2—2 of Fig. 1, with parts broken away.

In the drawings, I have illustrated the invention used with a rotatable shaft 10. The bearing comprises an interior part which rotates in unison with the shaft 10 and this part 11 is keyed to the shaft or pressed thereon so as to rotate with the shaft. Formed in one of the end walls of the rotating part 11 is a groove 12 which is curvilinear in cross-section and which extends out to the radial flange 13. A similar radial flange 15 is formed on the opposite end of the member 11 and formed in the opposite face of the member 11 is a groove 14 which is also curvilinear or circular in cross-section. A peripheral groove 16 is formed in the member 11 at substantially the transverse medial line.

The outer portion consists of a housing or retainer comprising a pair of sections, one of the sections having an end wall 17 in the inner face of which is formed an annular groove 18 curvilinear or circular in cross section. This groove 18, co-operating with the groove 12, provides a runway or race for the balls 19. It will be noted that the balls 19 are spaced apart from the inner face of the wall 21, this section being substantially cup-shaped.

Formed in the inner face of the wall 21 at its edge is a groove 22 which is curvilinear. The wall 21 is provided with an outwardly projecting tongue 23 which overlaps the tongue 24, formed on and projecting outwardly from the edge of the wall 26 of the cup-shaped member having a base 28. Formed in the section 24 is an annular groove 25 which is also curvilinear in cross-section, the grooves 22 and 25 together forming with the groove 16 a race-way for the balls 27 which serve to resist radial thrust delivered by the shaft 10. It will be noted that the line of juncture between the two cup-shaped sections of the retainer or housing is off-set from the diameter of the balls 27 and these overlapping sections or parts 22 and 24 are secured together by means of screws 31 or in any other suitable manner.

Formed in the inner face of the base 28 of the other cup-shaped section of the housing is an annular groove 29 which is curvilinear or circular in cross-section which co-operates with the groove 14 to provide a race-way for the balls 30.

In use, when the bearing has been mounted on the shaft 10, as indicated in Fig. 1, the retaining housing embodying the pair of sections would be mounted on a suitable support in fixed relation so that it remains stationary and upon a rotation of the shaft 10, the member 11 would rotate with it. The balls 27 would serve to resist the radial thrust delivered from the shaft and the balls 30 would serve to resist longitudinal or axial thrust in one direction while the balls 19 would serve to resist axial or longitudinal thrust delivered by the shaft in the other direction. Consequently, I have provided in a compact bearing a radial thrust bearing and an end thrust bearing. The bearing lends itself, particularly, for use on shafts used in connection with airplanes and turbine shafts used on ships. In use for other purposes will, of course, suggest itself as the need arises.

It is believed obvious that the mechanism may be very easily and quickly assembled and disassembled as it is but necessary to remove one cup-shaped section from position whereupon the other cup-shaped section may also be removed by a slight tilting and, thus, access to the rotating part 11 of the bearing obtained.

What I claim as new is:

1. A bearing of the class described, comprising: a stationary housing embodying a pair of cup-shaped members faced toward each other and secured together at their open edges, each of said cup-shaped members having an annular groove formed on the inner face of its bottom and curvilinear in cross-section; a rotatable member mounted within said housing and adapted for rotation in unison with a shaft projected through said housing and provided on its opposite end faces with an annular groove curvilinear in cross-section co-operating with the groove in the opposed face of the cup-shaped member to provide a ball race; a plurality of balls in each of said races, each of said cup-shaped members having an annular groove formed on its inner face adjacent its edge and said rotatable member having an annular groove formed on its periphery adjacent its center in alignment with the grooves formed in the inner surfaces of said cup-shaped members adjacent their edges to provide a ball race; and a plurality of balls mounted in said race for resisting radial thrust delivered by said shaft.

2. A bearing of the class described, comprising: a rotatable member adapted for mounting in fixed relation on a shaft with which used and rotatable in unison therewith; a housing enclosing said rotatable member and through which said shaft projects and comprising: a pair of cup-shaped sections arranged in opposed relation with their open edges in engagement with each other and each of said cup-shaped sections having an annular groove curvilinear in cross-section formed on its inner face, there being an annular groove on the end face of said first named member co-operating with the grooves on the bottoms of said sections to provide race-ways; and balls positioned in said race-ways for resisting axial thrust delivered by said shaft; and means for securing said sections in fixed relation, there being an annular groove formed on the periphery of said first named member at substantially the transverse medial line and opposed to an annular groove formed on the inner face of the meeting portions of said cup-shaped sections to provide a race-way; and balls mounted in said last named race-way for resisting radial thrust delivered by said shaft, said last named balls being diametrically off-set from the line of juncture of said cup-shaped sections.

CHARLES H. WITTHOFFT.

REFERENCES CITED

The following references are of record in the file of this patent:

UNITED STATES PATENTS

| Number | Name | Date |
| --- | --- | --- |
| 1,591,395 | McNeely | July 6, 1926 |
| 2,197,499 | Heinze | Apr. 16, 1940 |